United States Patent
Graunke

(10) Patent No.: US 8,675,865 B2
(45) Date of Patent: Mar. 18, 2014

(54) METHOD AND APPARATUS FOR A HIGH BANDWIDTH STREAM CIPHER

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 12/889,901

(22) Filed: Sep. 24, 2010

(65) Prior Publication Data

US 2012/0076296 A1 Mar. 29, 2012

(51) Int. Cl.
*H04K 1/00* (2006.01)

(52) U.S. Cl.
USPC .......................................................... 380/28

(58) Field of Classification Search
USPC ....................................... 380/28, 37
See application file for complete search history.

(56) References Cited

U.S. PATENT DOCUMENTS

2008/0148063 A1* 6/2008 Hanko et al. .................. 713/189
2010/0002872 A1* 1/2010 Shibutani et al. ............... 380/28

OTHER PUBLICATIONS

Ross Anderson et al., Serpent: A Flexible Block Cipher With Maximum Assurance, 1998, 10 pages, in the First Advanced Encryption Standard Candidate Conference.
Advanced Encryption Standard (AES), Nov. 26, 2001, 51 pages, National Institute of Standards and Technology (NIST).
High-bandwidth Digital Content Protection System, Jul. 8, 2009, 90 pages, Revision 1.4, Digital Content Protection LLC.

* cited by examiner

*Primary Examiner* — Philip Chea
*Assistant Examiner* — Daniel Hoang
(74) *Attorney, Agent, or Firm* — Trop, Pruner & Hu, P.C.

(57) ABSTRACT

A method and apparatus for a high-bandwidth stream cipher. In one embodiment of the invention, the stream cipher has an output function that receives secret state bits from a block cipher and generates an encryption mask. In one embodiment of the invention, the encryption mask has a lesser or smaller number of bits than the secret state bits. The stream cipher uses the encryption mask to encrypt a video data stream to generate an encrypted video data stream.

20 Claims, 10 Drawing Sheets

| 610 S1 layer | | 620 Registers K and B (Input source) | |
|---|---|---|---|
| 612 Box | 614 Input bit | 622 Register | 624 Output bit |
| S1{XYZ} i in 0..13 | 0 | K{xyz} | 2*i |
| S1{XYZ} i in 0..13 | 1 | K{xyz} | 2*i +1 |
| S1{XYZ} i in 0..13 | 2 | B{xyz} | 2*i |
| S1{XYZ} i in 0..13 | 3 | B{xyz} | 2*i +1 |

600      FIG. 6A

| 710 LT layer | | 720 S1 layer (Input source) | |
|---|---|---|---|
| 712 Box | 714 Input bit | 722 Box | 724 Output bit |
| LTX0 | j in 0..13 | $X_j$ | 0 |
| LTX1 | j in 0..13 | $Y_j$ | 0 |
| LTX2 | j in 0..13 | $Z_j$ | 0 |
| LTX3 | j in 0...6 | $X_{j+7}$ | 3 |
| LTX3 | j in 7..13 | $X_{j-7}$ | 3 |
| LTY0 | j in 0..13 | $X_j$ | 1 |
| LTY1 | j in 0..13 | $Y_j$ | 1 |
| LTY2 | j in 0..13 | $Z_j$ | 1 |
| LTY3 | j in 0...6 | $Y_{j+7}$ | 3 |
| LTY3 | j in 7..13 | $Y_{j-7}$ | 3 |
| LTZ0 | j in 0..13 | $X_j$ | 2 |
| LTZ1 | j in 0..13 | $Y_j$ | 2 |
| LTZ2 | j in 0..13 | $Z_j$ | 2 |
| LTZ3 | j in 0...6 | $Z_{j+7}$ | 3 |
| LTZ3 | j in 7..13 | $Z_{j-7}$ | 3 |

700      FIG. 7A

| 660 S1 Box | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| S1X0 | 10 | 0 | 7 | 11 | 5 | 6 | 2 | 12 | 1 | 15 | 13 | 4 | 8 | 3 | 14 | 9 |
| S1X1 | 5 | 15 | 6 | 10 | 11 | 8 | 13 | 1 | 9 | 4 | 0 | 7 | 12 | 2 | 3 | 14 |
| S1X2 | 6 | 15 | 0 | 12 | 3 | 4 | 9 | 7 | 8 | 1 | 5 | 10 | 14 | 11 | 2 | 13 |
| S1X3 | 14 | 7 | 9 | 12 | 13 | 11 | 0 | 6 | 5 | 2 | 15 | 1 | 10 | 4 | 3 | 8 |
| S1X4 | 11 | 12 | 2 | 9 | 7 | 10 | 1 | 6 | 0 | 3 | 15 | 5 | 14 | 13 | 4 | 8 |
| S1X5 | 0 | 5 | 3 | 8 | 13 | 14 | 4 | 2 | 10 | 15 | 12 | 1 | 6 | 9 | 11 | 7 |
| S1X6 | 9 | 12 | 14 | 2 | 5 | 6 | 8 | 15 | 4 | 3 | 7 | 13 | 11 | 0 | 1 | 10 |
| S1X7 | 8 | 15 | 3 | 9 | 14 | 5 | 13 | 6 | 7 | 0 | 10 | 12 | 2 | 11 | 4 | 1 |
| S1X8 | 12 | 11 | 15 | 2 | 10 | 1 | 0 | 7 | 3 | 6 | 5 | 9 | 13 | 8 | 14 | 4 |
| S1X9 | 3 | 15 | 6 | 1 | 9 | 0 | 12 | 7 | 4 | 2 | 8 | 11 | 10 | 13 | 5 | 14 |
| S1X10 | 10 | 1 | 12 | 6 | 13 | 8 | 0 | 3 | 9 | 7 | 5 | 11 | 2 | 14 | 15 | 4 |
| S1X11 | 6 | 12 | 13 | 1 | 5 | 11 | 2 | 7 | 10 | 3 | 0 | 14 | 15 | 8 | 9 | 4 |
| S1X12 | 4 | 11 | 1 | 2 | 10 | 5 | 13 | 14 | 8 | 6 | 7 | 12 | 3 | 15 | 0 | 9 |
| S1X13 | 14 | 3 | 1 | 10 | 9 | 5 | 6 | 0 | 8 | 13 | 2 | 7 | 4 | 11 | 15 | 12 |
| S1Y0 | 0 | 15 | 14 | 5 | 6 | 8 | 11 | 2 | 10 | 9 | 1 | 12 | 3 | 4 | 13 | 7 |
| S1Y1 | 0 | 9 | 5 | 14 | 12 | 2 | 3 | 13 | 6 | 10 | 15 | 4 | 1 | 7 | 8 | 11 |
| S1Y2 | 4 | 13 | 8 | 11 | 10 | 6 | 7 | 0 | 14 | 3 | 1 | 12 | 9 | 15 | 2 | 5 |
| S1Y3 | 0 | 12 | 10 | 9 | 14 | 11 | 1 | 7 | 6 | 15 | 13 | 2 | 3 | 5 | 4 | 8 |
| S1Y4 | 14 | 1 | 9 | 15 | 3 | 12 | 10 | 6 | 7 | 13 | 2 | 4 | 0 | 11 | 5 | 8 |
| S1Y5 | 13 | 10 | 1 | 12 | 6 | 3 | 11 | 5 | 14 | 0 | 4 | 7 | 9 | 15 | 2 | 8 |
| S1Y6 | 9 | 7 | 14 | 13 | 10 | 12 | 4 | 1 | 6 | 8 | 0 | 11 | 3 | 5 | 15 | 2 |
| S1Y7 | 13 | 11 | 3 | 6 | 8 | 4 | 5 | 15 | 7 | 0 | 14 | 9 | 1 | 10 | 2 | 12 |
| S1Y8 | 6 | 15 | 13 | 1 | 11 | 4 | 14 | 2 | 0 | 5 | 3 | 8 | 12 | 10 | 9 | 7 |
| S1Y9 | 11 | 1 | 7 | 12 | 13 | 10 | 2 | 5 | 14 | 8 | 4 | 15 | 3 | 6 | 9 | 0 |
| S1Y10 | 14 | 5 | 9 | 12 | 8 | 6 | 3 | 0 | 4 | 11 | 15 | 2 | 7 | 1 | 10 | 13 |
| S1Y11 | 14 | 3 | 1 | 12 | 4 | 10 | 15 | 9 | 7 | 13 | 2 | 11 | 8 | 6 | 5 | 0 |
| S1Y12 | 1 | 7 | 14 | 4 | 15 | 10 | 0 | 13 | 6 | 11 | 3 | 8 | 5 | 12 | 9 | 2 |
| S1Y13 | 3 | 13 | 5 | 8 | 10 | 6 | 12 | 11 | 0 | 7 | 14 | 4 | 15 | 9 | 1 | 2 |
| S1Z0 | 13 | 3 | 7 | 0 | 8 | 6 | 1 | 10 | 14 | 4 | 2 | 11 | 5 | 9 | 15 | 12 |
| S1Z1 | 11 | 0 | 13 | 10 | 5 | 6 | 8 | 15 | 2 | 14 | 4 | 1 | 9 | 3 | 7 | 12 |
| S1Z2 | 14 | 0 | 8 | 7 | 1 | 12 | 11 | 2 | 3 | 5 | 6 | 9 | 10 | 15 | 13 | 4 |
| S1Z3 | 1 | 2 | 10 | 12 | 13 | 14 | 0 | 7 | 6 | 9 | 3 | 15 | 11 | 4 | 5 | 8 |
| S1Z4 | 12 | 5 | 10 | 6 | 0 | 14 | 13 | 11 | 9 | 3 | 7 | 8 | 15 | 4 | 2 | 1 |
| S1Z5 | 3 | 0 | 8 | 13 | 6 | 11 | 1 | 7 | 15 | 12 | 5 | 10 | 9 | 2 | 14 | 4 |
| S1Z6 | 5 | 8 | 12 | 6 | 10 | 13 | 0 | 11 | 2 | 14 | 9 | 3 | 1 | 7 | 15 | 4 |
| S1Z7 | 11 | 5 | 8 | 14 | 7 | 10 | 2 | 13 | 6 | 15 | 1 | 4 | 0 | 9 | 12 | 3 |
| S1Z8 | 4 | 10 | 3 | 5 | 14 | 13 | 8 | 2 | 7 | 0 | 12 | 9 | 11 | 6 | 1 | 15 |
| S1Z9 | 12 | 10 | 11 | 1 | 7 | 4 | 13 | 8 | 3 | 9 | 5 | 6 | 14 | 2 | 0 | 15 |
| S1Z10 | 8 | 15 | 7 | 10 | 1 | 2 | 11 | 4 | 5 | 3 | 12 | 9 | 6 | 13 | 0 | 14 |
| S1Z11 | 1 | 10 | 7 | 4 | 13 | 0 | 2 | 11 | 14 | 3 | 9 | 15 | 8 | 6 | 5 | 12 |
| S1Z12 | 3 | 13 | 8 | 14 | 6 | 10 | 11 | 4 | 12 | 1 | 7 | 2 | 5 | 15 | 0 | 9 |
| S1Z13 | 15 | 12 | 0 | 7 | 10 | 6 | 3 | 8 | 2 | 1 | 5 | 11 | 4 | 13 | 9 | 14 |

650      FIG. 6B

| 760 LT Output | 770 Function |
|---|---|
| $O_0$ | $I_1 \oplus I_4 \oplus I_5 \oplus I_6 \oplus I_8 \oplus I_9 \oplus I_{11}$ |
| $O_1$ | $I_0 \oplus I_2 \oplus I_5 \oplus I_6 \oplus I_7 \oplus I_9 \oplus I_{10} \oplus I_{12}$ |
| $O_2$ | $I_1 \oplus I_3 \oplus I_6 \oplus I_7 \oplus I_8 \oplus I_{10} \oplus I_{11} \oplus I_{13}$ |
| $O_3$ | $I_0 \oplus I_2 \oplus I_4 \oplus I_7 \oplus I_8 \oplus I_9 \oplus I_{11} \oplus I_{12}$ |
| $O_4$ | $I_1 \oplus I_3 \oplus I_5 \oplus I_8 \oplus I_9 \oplus I_{10} \oplus I_{12} \oplus I_{13}$ |
| $O_5$ | $I_0 \oplus I_2 \oplus I_4 \oplus I_6 \oplus I_9 \oplus I_{10} \oplus I_{11} \oplus I_{13}$ |
| $O_6$ | $I_1 \oplus I_3 \oplus I_5 \oplus I_7 \oplus I_{10} \oplus I_{11} \oplus I_{12}$ |
| $O_7$ | $I_2 \oplus I_4 \oplus I_6 \oplus I_8 \oplus I_{11} \oplus I_{12} \oplus I_{13}$ |
| $O_8$ | $I_0 \oplus I_3 \oplus I_5 \oplus I_7 \oplus I_9 \oplus I_{12} \oplus I_{13}$ |
| $O_9$ | $I_0 \oplus I_1 \oplus I_4 \oplus I_6 \oplus I_8 \oplus I_{10} \oplus I_{13}$ |
| $O_{10}$ | $I_0 \oplus I_1 \oplus I_2 \oplus I_5 \oplus I_7 \oplus I_9 \oplus I_{11}$ |
| $O_{11}$ | $I_0 \oplus I_1 \oplus I_2 \oplus I_3 \oplus I_6 \oplus I_8 \oplus I_{10} \oplus I_{11}$ |
| $O_{12}$ | $I_1 \oplus I_2 \oplus I_3 \oplus I_4 \oplus I_7 \oplus I_9 \oplus I_{11} \oplus I_{13}$ |
| $O_{13}$ | $I_2 \oplus I_3 \oplus I_4 \oplus I_5 \oplus I_8 \oplus I_{10} \oplus I_{12}$ |

750            FIG. 7B

| 810 S2 layer | | 820 LT layer | |
|---|---|---|---|
| 812 Box | 814 Input bit | 822 Box | 824 Output bit |
| S2{XYZ} i in 0..13 | 0 | LT{XYZ}0 | i |
| S2{XYZ} i in 0..13 | 1 | LT{XYZ}1 | i |
| S2{XYZ} i in 0..13 | 2 | LT{XYZ}2 | i |
| S2{XYZ} i in 0..13 | 3 | LT{XYZ}3 | i |

800            FIG. 8A

| 860 S2 Box | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| S2X0 | 14 | 7 | 11 | 12 | 0 | 9 | 13 | 6 | 8 | 4 | 1 | 10 | 5 | 3 | 2 | 15 |
| S2X1 | 9 | 2 | 5 | 12 | 14 | 8 | 3 | 6 | 10 | 13 | 15 | 0 | 7 | 1 | 4 | 11 |
| S2X2 | 12 | 5 | 15 | 9 | 11 | 14 | 1 | 2 | 6 | 10 | 8 | 7 | 0 | 3 | 13 | 4 |
| S2X3 | 12 | 0 | 6 | 11 | 5 | 3 | 9 | 4 | 7 | 14 | 1 | 2 | 10 | 13 | 15 | 8 |
| S2X4 | 9 | 14 | 5 | 8 | 7 | 1 | 2 | 13 | 15 | 3 | 12 | 6 | 4 | 10 | 11 | 0 |
| S2X5 | 7 | 8 | 11 | 6 | 0 | 3 | 13 | 10 | 14 | 4 | 1 | 15 | 5 | 9 | 2 | 12 |
| S2X6 | 1 | 11 | 14 | 2 | 13 | 4 | 3 | 9 | 15 | 12 | 8 | 7 | 6 | 10 | 5 | 0 |
| S2X7 | 3 | 13 | 10 | 0 | 15 | 8 | 12 | 5 | 14 | 1 | 9 | 6 | 4 | 7 | 2 | 11 |
| S2X8 | 1 | 11 | 10 | 13 | 8 | 14 | 6 | 3 | 12 | 7 | 5 | 2 | 15 | 4 | 0 | 9 |
| S2X9 | 0 | 3 | 7 | 14 | 13 | 6 | 4 | 8 | 15 | 9 | 10 | 5 | 2 | 12 | 1 | 11 |
| S2X10 | 8 | 7 | 3 | 9 | 11 | 2 | 13 | 4 | 15 | 0 | 10 | 12 | 5 | 14 | 6 | 1 |
| S2X11 | 0 | 6 | 5 | 11 | 7 | 8 | 12 | 1 | 3 | 10 | 15 | 4 | 14 | 13 | 9 | 2 |
| S2X12 | 2 | 15 | 11 | 0 | 4 | 1 | 14 | 13 | 9 | 5 | 12 | 3 | 10 | 6 | 7 | 8 |
| S2X13 | 6 | 10 | 3 | 4 | 5 | 12 | 9 | 7 | 13 | 1 | 0 | 14 | 8 | 11 | 15 | 2 |
| S2Y0 | 2 | 9 | 1 | 6 | 5 | 3 | 12 | 15 | 14 | 7 | 13 | 8 | 0 | 10 | 11 | 4 |
| S2Y1 | 6 | 3 | 15 | 9 | 5 | 10 | 8 | 7 | 13 | 0 | 4 | 14 | 2 | 12 | 1 | 11 |
| S2Y2 | 4 | 1 | 3 | 10 | 7 | 13 | 12 | 0 | 2 | 15 | 14 | 9 | 8 | 6 | 11 | 5 |
| S2Y3 | 12 | 6 | 11 | 8 | 15 | 3 | 5 | 14 | 2 | 13 | 4 | 1 | 9 | 0 | 10 | 7 |
| S2Y4 | 3 | 4 | 12 | 11 | 14 | 8 | 7 | 1 | 6 | 10 | 0 | 13 | 5 | 15 | 9 | 2 |
| S2Y5 | 10 | 5 | 13 | 14 | 6 | 8 | 3 | 4 | 0 | 9 | 11 | 7 | 15 | 2 | 12 | 1 |
| S2Y6 | 10 | 15 | 3 | 5 | 4 | 9 | 13 | 6 | 7 | 2 | 0 | 12 | 8 | 14 | 11 | 1 |
| S2Y7 | 6 | 1 | 12 | 7 | 13 | 8 | 10 | 4 | 3 | 15 | 9 | 0 | 14 | 2 | 5 | 11 |
| S2Y8 | 1 | 8 | 12 | 11 | 15 | 6 | 0 | 13 | 4 | 14 | 10 | 7 | 3 | 5 | 9 | 2 |
| S2Y9 | 9 | 10 | 5 | 15 | 0 | 13 | 3 | 4 | 7 | 12 | 8 | 6 | 11 | 2 | 14 | 1 |
| S2Y10 | 2 | 9 | 7 | 0 | 4 | 15 | 10 | 5 | 11 | 14 | 13 | 3 | 8 | 1 | 6 | 12 |
| S2Y11 | 8 | 2 | 3 | 5 | 1 | 13 | 15 | 6 | 11 | 12 | 14 | 0 | 7 | 10 | 4 | 9 |
| S2Y12 | 12 | 2 | 10 | 4 | 11 | 7 | 0 | 13 | 3 | 14 | 15 | 9 | 8 | 1 | 5 | 6 |
| S2Y13 | 7 | 4 | 11 | 14 | 9 | 2 | 6 | 13 | 0 | 3 | 5 | 8 | 10 | 12 | 15 | 1 |
| S2Z0 | 15 | 1 | 2 | 11 | 12 | 7 | 9 | 14 | 0 | 6 | 13 | 8 | 5 | 10 | 3 | 4 |
| S2Z1 | 9 | 7 | 3 | 8 | 15 | 10 | 6 | 5 | 2 | 11 | 4 | 13 | 12 | 0 | 1 | 14 |
| S2Z2 | 12 | 0 | 6 | 3 | 2 | 13 | 5 | 10 | 1 | 11 | 15 | 8 | 4 | 14 | 9 | 7 |
| S2Z3 | 0 | 15 | 13 | 3 | 12 | 10 | 2 | 9 | 5 | 8 | 14 | 4 | 6 | 1 | 11 | 7 |
| S2Z4 | 7 | 9 | 8 | 5 | 13 | 3 | 4 | 14 | 12 | 0 | 15 | 10 | 11 | 6 | 2 | 1 |
| S2Z5 | 9 | 10 | 2 | 12 | 4 | 13 | 7 | 11 | 5 | 6 | 8 | 3 | 15 | 0 | 1 | 14 |
| S2Z6 | 12 | 6 | 10 | 5 | 7 | 9 | 4 | 3 | 0 | 11 | 15 | 2 | 13 | 14 | 1 | 8 |
| S2Z7 | 1 | 13 | 7 | 2 | 11 | 0 | 12 | 15 | 4 | 3 | 14 | 9 | 8 | 6 | 5 | 10 |
| S2Z8 | 14 | 9 | 1 | 6 | 5 | 12 | 2 | 15 | 7 | 4 | 11 | 8 | 0 | 10 | 13 | 3 |
| S2Z9 | 14 | 9 | 13 | 4 | 0 | 6 | 3 | 15 | 11 | 12 | 1 | 2 | 7 | 10 | 8 | 5 |
| S2Z10 | 14 | 5 | 3 | 6 | 7 | 9 | 12 | 10 | 2 | 8 | 4 | 13 | 1 | 15 | 11 | 0 |
| S2Z11 | 1 | 7 | 6 | 12 | 2 | 9 | 11 | 5 | 4 | 8 | 10 | 15 | 14 | 3 | 13 | 0 |
| S2Z12 | 9 | 15 | 5 | 2 | 12 | 0 | 6 | 13 | 14 | 4 | 11 | 7 | 3 | 10 | 8 | 1 |
| S2Z13 | 12 | 5 | 1 | 2 | 3 | 6 | 15 | 9 | 7 | 14 | 13 | 8 | 0 | 11 | 10 | 4 |

FIG. 8B

| 910 Encryption mask | 920 S2 layer (Input source) | | 910 Encryption mask | 920 S2 layer (Input source) | |
|---|---|---|---|---|---|
| | 922 Box | 924 Output bit | | 922 Box | 924 Output bit |
| 0 | S2X1 | 0 | 30 | S2Y12 | 1 |
| 1 | S2X1 | 1 | 31 | S2Y12 | 2 |
| 2 | S2X2 | 0 | 32 | S2Z1 | 1 |
| 3 | S2X2 | 1 | 33 | S2Z1 | 3 |
| 4 | S2X3 | 1 | 34 | S2Z2 | 1 |
| 5 | S2X3 | 3 | 35 | S2Z2 | 3 |
| 6 | S2X4 | 2 | 36 | S2Z3 | 0 |
| 7 | S2X4 | 3 | 37 | S2Z3 | 2 |
| 8 | S2X5 | 0 | 38 | S2Z4 | 1 |
| 9 | S2X5 | 2 | 39 | S2Z4 | 3 |
| 10 | S2X8 | 0 | 40 | S2Z5 | 0 |
| 11 | S2X8 | 3 | 41 | S2Z5 | 3 |
| 12 | S2X11 | 0 | 42 | S2Z8 | 0 |
| 13 | S2X11 | 2 | 43 | S2Z8 | 2 |
| 14 | S2X12 | 0 | 44 | S2Z11 | 0 |
| 15 | S2X12 | 3 | 45 | S2Z11 | 2 |
| 16 | S2Y1 | 0 | 46 | S2Z12 | 0 |
| 17 | S2Y1 | 3 | 47 | S2Z12 | 2 |
| 18 | S2Y2 | 0 | | | |
| 19 | S2Y2 | 1 | | | |
| 20 | S2Y3 | 0 | | | |
| 21 | S2Y3 | 1 | | | |
| 22 | S2Y4 | 0 | | | |
| 23 | S2Y4 | 2 | | | |
| 24 | S2Y5 | 0 | | | |
| 25 | S2Y5 | 2 | | | |
| 26 | S2Y8 | 2 | | | |
| 27 | S2Y8 | 3 | | | |
| 28 | S2Y11 | 0 | | | |
| 29 | S2Y11 | 3 | | | |

FIG. 9

METHOD AND APPARATUS FOR A HIGH BANDWIDTH STREAM CIPHER

FIELD OF THE INVENTION

This invention relates to a stream cipher, and more specifically but not exclusively, to a method and apparatus for a high-bandwidth stream cipher.

BACKGROUND DESCRIPTION

The protection of media contents is important to prevent authorized usage or duplication. The High-bandwidth Digital Content Protection (HDCP) is a form of digital copy protection that can prevent copying of digital audio and video contents as the contents travel across interfaces such as Display-Port, Digital Visual Interface (DVI), High-Definition Multimedia Interface (HDMI), Gigabit Video Interface (GVIF), and Unified Display Interface (UDI) connections.

BRIEF DESCRIPTION OF THE DRAWINGS

The features and advantages of embodiments of the invention will become apparent from the following detailed description of the subject matter in which:

FIG. 6A illustrates a mapping table of a 168-bit state to a substitution layer one (S1) in accordance with one embodiment of the invention;

FIG. 6B illustrates a substitution box (S-box) table in accordance with one embodiment of the invention;

FIG. 7A illustrates a mapping table of a S1 layer to a linear transformation (LT) layer in accordance with one embodiment of the invention;

FIG. 7B illustrates a linear transformation table in accordance with one embodiment of the invention;

FIG. 8A illustrates a mapping table of a LT layer to a S2 layer in accordance with one embodiment of the invention;

FIG. 8B illustrates a S-box table in accordance with one embodiment of the invention;

FIG. 9 illustrates a selection table for an encryption mask in accordance with one embodiment of the invention;

DETAILED DESCRIPTION

Figure 1:
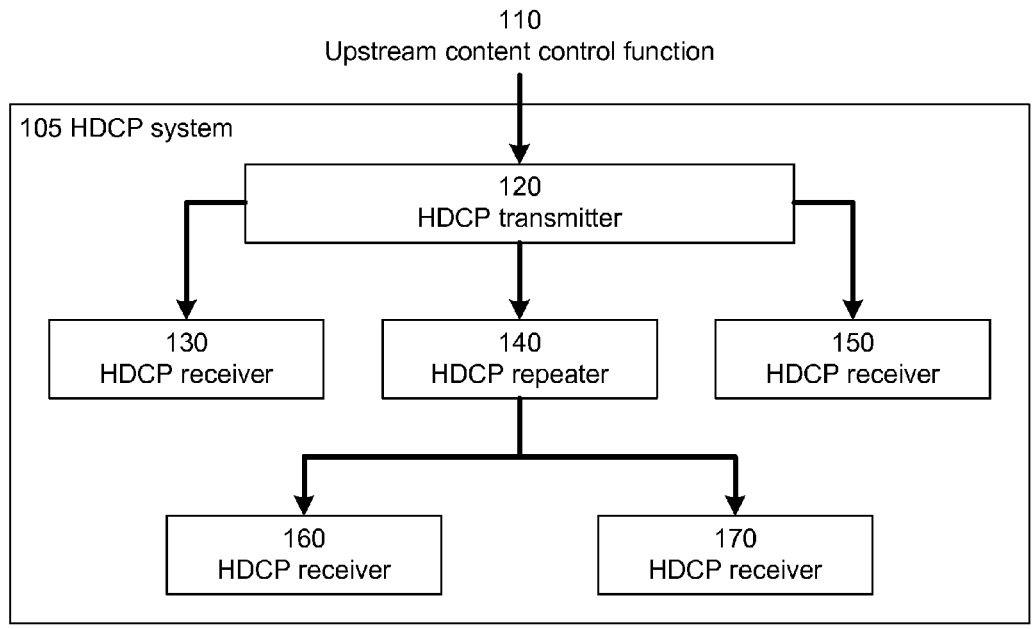
FIG. 1 illustrates a block diagram of a HDCP system in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus for a high-bandwidth stream cipher. In one embodiment of the invention, the stream cipher has an output function that receives secret state bits from a block cipher and generates an encryption mask. In one embodiment of the invention, the encryption mask has a lesser or smaller number of bits than the secret state bits. The stream cipher uses the encryption mask to encrypt a video data stream to generate an encrypted video data stream. The stream cipher has an unkeyed or fixed-keyed block cipher to create a one-way output function of the secret state bits. One or more bits of the secret state are discarded in a uniform way to thwart or minimize the invertibility of a portion(s) of the secret state bits in one embodiment of the invention.

FIG. 1 illustrates a block diagram 100 of a HDCP system 105 in accordance with one embodiment of the invention. The HDCP system 105 has a HDCP transmitter 120 that receives audiovisual contents from the upstream content control function 110. The upstream content control function 110 provides audiovisual contents that are required to be emitted or shown on a receiver(s) in one embodiment of the invention.

The HDCP transmitter 120 has a stream cipher to encrypt the audiovisual contents received from the upstream content control function 110. The HDCP transmitter 120 is coupled with the HDCP receivers 130 and 150 and the HDCP repeater 140. The HDCP transmitter 120 encrypts the audiovisual contents and sends the encrypted audiovisual contents to the HDCP receivers 130 and 150 and the HDCP repeater 140.

The HDCP repeater 140 receives the encrypted audiovisual contents and forwards it to the HDCP receivers 160 and 170. The HDCP receivers 130, 150, 160 and 170 have a stream cipher to decrypt the encrypted audiovisual contents and the decrypted audiovisual contents can be sent to a display source (not shown in FIG. 1).

In one embodiment of the invention, the HDCP system 105 is compliant at least in part with the HDCP specification ("Mapping HDCP to DiiVA", Digital Content Protection LLC, Revision 2.0, Mar. 23, 2010). For example, in one embodiment of the invention, the HDCP transmitter 120 generates a forty-eight bit encryption mask to encrypt a video pixel stream of up to forty-eight bits in compliance with the HDCP specification. In another embodiment of the invention, the HDCP transmitter 120 generates an encryption mask with more than forty-eight bits. One of ordinary skill in the relevant art will readily appreciate that the HDCP transmitter 120 can generate an encryption mask with any number of bits without affecting the workings of the invention.

The HDCP system 105 illustrated in FIG. 1 is not meant to be limiting. One of ordinary skill in the relevant art will readily appreciate that other variations of the configuration of the HDCP system 105 can be used without affecting the workings of the invention. The communication interface among the HDCP transmitter 120, the HDCP receivers 130, 150, 160 and 170, and the HDCP repeater 140 includes, but is not limited to, Digital Visual Interface (DVI), High Definition Multimedia Interface (HDMI), Unified Display Interface (UDI), Giga-bit Video Interface (GVIF), Digital Light Interface (DLI), DisplayPort, HDBaseT, Mobile High-Definition Link (MHL), Gigabit Multimedia Serial Link (GMSL), Flat Panel Display Link Third Generation (FPD-Link III), Digital Interactive Interface for Video and Audio (DiiVA) and any other communication interfaces.

Figure 2:
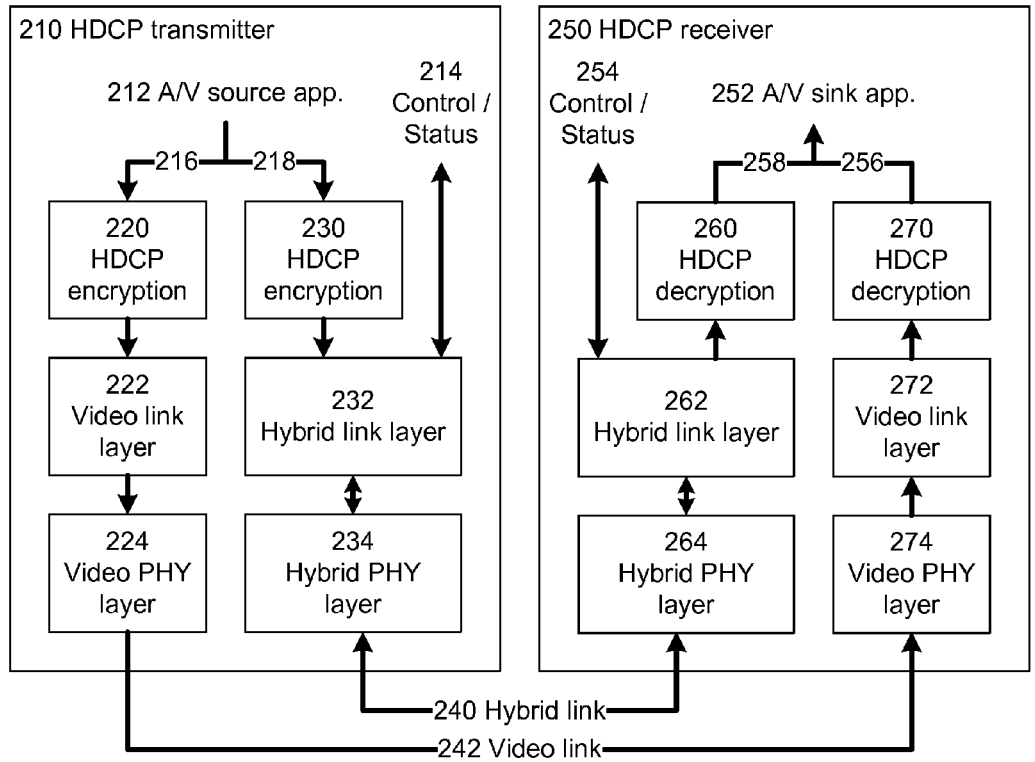
FIG. 2 illustrates a block diagram of a HDCP transmitter and a HDCP receiver in accordance with one embodiment of the invention.

FIG. 2 illustrates a block diagram 200 of a HDCP transmitter 210 and a HDCP receiver 250 in accordance with one embodiment of the invention. The HDCP transmitter 210 receives audiovisual (A/V) contents from an A/V source application 212. In one embodiment of the invention, the A/V contents are separated into a video stream 216 and an audio stream 218. The video stream 216 is sent to a HDCP encryption module 220 that has a stream cipher. The stream cipher in the HDCP encryption module 220 encrypts the video stream 216 and sends the encrypted video stream to the video link layer 222. The video link layer 222 processes the encrypted video stream and sends it to the video physical (PHY) layer 224. The processing of the encrypted video stream includes, but is not limited to, encapsulation, error-correcting code (ECC) encoding and the like. The video PHY layer 224 sends the encrypted video stream via a video communication link 242 to the HDCP receiver 250.

The audio stream 218 is sent to a HDCP encryption module 230 that has a stream cipher. The stream cipher in the HDCP encryption module 230 encrypts the audio stream 218 and sends the encrypted audio stream to the hybrid link layer 232. The hybrid link layer 232 processes the encrypted audio stream and sends it to the hybrid PHY layer 234. The hybrid link layer 232 also receives or sends the control and/or status signals 214 in one embodiment of the invention. The hybrid PHY layer 234 sends the encrypted audio stream and/or the control and/or status signals 214 via a hybrid communication link 240 to the HDCP receiver 250.

The video PHY layer 274 of the HDCP receiver 250 receives the encrypted video stream from the HDCP transmitter 210 via the video communication link 242. The video PHY layer 274 processes the encrypted video stream and sends it to the video link layer 272. The processing of the video PHY layer 274 includes, but is not limited to, de-capsulation, ECC decoding and the like. The video link layer 272 receives the encrypted video stream and sends it to the HDCP decryption module 270. The HDCP decryption module 270 decrypts the encrypted video stream and sends the decrypted video stream to the A/V sink application 252.

The hybrid PHY layer 264 of the HDCP receiver 250 receives the encrypted audio stream from the HDCP transmitter 210 via the hybrid communication link 240. The hybrid PHY layer 264 processes the encrypted audio stream and sends it to the hybrid link layer 262. The processing of the hybrid PHY layer 264 includes, but is not limited to, de-capsulation, ECC decoding and the like. The hybrid link layer 262 receives the encrypted audio stream and sends it to the HDCP decryption module 260. The HDCP decryption module 270 decrypts the encrypted audio stream and sends the decrypted audio stream to the A/V sink application 252. The hybrid link layer 262 also receives or sends the control and/or status signals 254 in one embodiment of the invention.

The block diagram 200 illustrates a mapping of the HDCP specification to the DiiVA specification in one embodiment of the invention and is not meant to be limiting. One of ordinary skill in the relevant art will readily appreciate how to modify the mapping of the HDCP specification to another communication interface and the modifications shall not be described herein.

Figure 3:
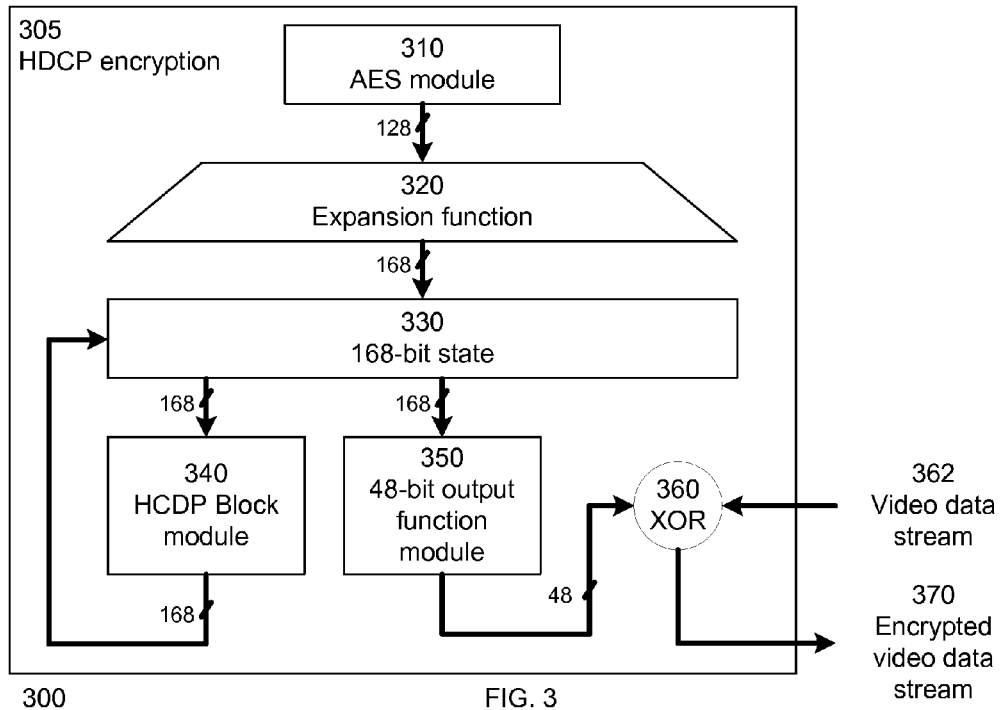
FIG. 3 illustrates a block diagram of an HDCP encryption module in accordance with one embodiment of the invention.

FIG. 3 illustrates a block diagram 300 of an HDCP encryption module 305 in accordance with one embodiment of the invention. The HDCP encryption module 305 has an Advanced Encryption Standard (AES) module 310. In one embodiment of the invention, the AES module 310 is compliant with the AES standard ("Advanced Encryption Standard", National Institute of Standards and Technology (NIST), FIPS Publication 197, Nov. 26, 2001).

In one embodiment of the invention, the AES module 310 operates in a Counter (CTR) mode and generates a 128-bit Video Key Stream (VKS). One of ordinary skill in the relevant art will readily appreciate how the AES module 310 generates the VKS and it shall not be described herein. The AES module 310 sends the 128-bit VKS to an expansion function module 320. The expansion function module 320 expands the 128-bit VKS into 168 bits in one embodiment of the invention. In one embodiment of the invention, the operation of the expansion function module 320 is in accordance with the HDCP specification and one of ordinary skill in the relevant art will readily appreciate how the 168 bits is generated from the expansion function module 320.

In another embodiment of the invention, the expansion function module 320 performs one or more operations of exclusive OR (XOR), complement function and the like, on the 128-bit VKS to generate the 168 bits. The AES module 310 sets the 168-bit state 330 with the generated 168 bits. The 168-bit state 330 or secret state bits or cipher state bits are received by a HDCP block module 340 and a 48-bit output function module 350. In one embodiment of the invention, the HDCP block module 340 is compliant at least in part with one of the HDCP specification revisions 1.0, 1.1, 1.2, 1.3, 1.4, 2.0 and other present and future revisions of the HDCP specification.

In one embodiment of the invention, the HDCP block module 340 receives the 168-bit state 330 and performs one or more round functions to update 168-bit state with a new secret state. In one embodiment of the invention, the operation of round function is in accordance with the HDCP specification and it shall not be described herein. The HDCP block module 340 has one or more block ciphers in one embodiment of the invention.

The 48-bit output function module 350 uses all 168 bits of the 168-bit state 330 as inputs to generate an one-way function of the 168-bit state 330. The HDCP block module 340 and the 48-bit output function module 350 ensures that it is computationally infeasible or difficult within the HDCP security limits to derive any part of the 168-bit state 330 from a long stream of cipher outputs.

In one embodiment of the invention, the 48-bit output function module 350 performs logic functions using only XOR and AND logic gates. The XOR logic can be viewed as the "addition" operation and the AND gate can be viewed as the "multiplication" operation. A Boolean algebraic expression for each output bit of the 48-bit output function module 350 can be written as the sum of products of the input bits of the 48-bit output function module 350. The maximum number of inputs bits in the sum of products of the input bits of the 48-bit output function module 350 is the degree of the polynomial expression. In one embodiment of the invention, each output of the 48-bit output function module 350 has up to degree 9 for the number of input bits.

The HDCP encryption module 305 performs an XOR operation 360 of the encryption mask of the 48-bit output function module 350 and a video data stream 362 to generate an encrypted video data stream 370. The video data stream 362 has a bit width including, but is not limited to, 12 bits, 24 bits, 48 bits or any other bit width in one embodiment of the invention.

The 48-bit output function module 350 produces a series of mask values for each video data stream in one embodiment of the invention. By performing the XOR operation of the mask values with each video data stream, the mask values are "added" (XOR) to each video data stream to produce ciphertext or encrypted video data stream. The encrypted video data stream is decrypted by a HDCP decryption module by performing another XOR operation of the encrypted video data stream with the mask values to get the original video data stream.

Figure 4:
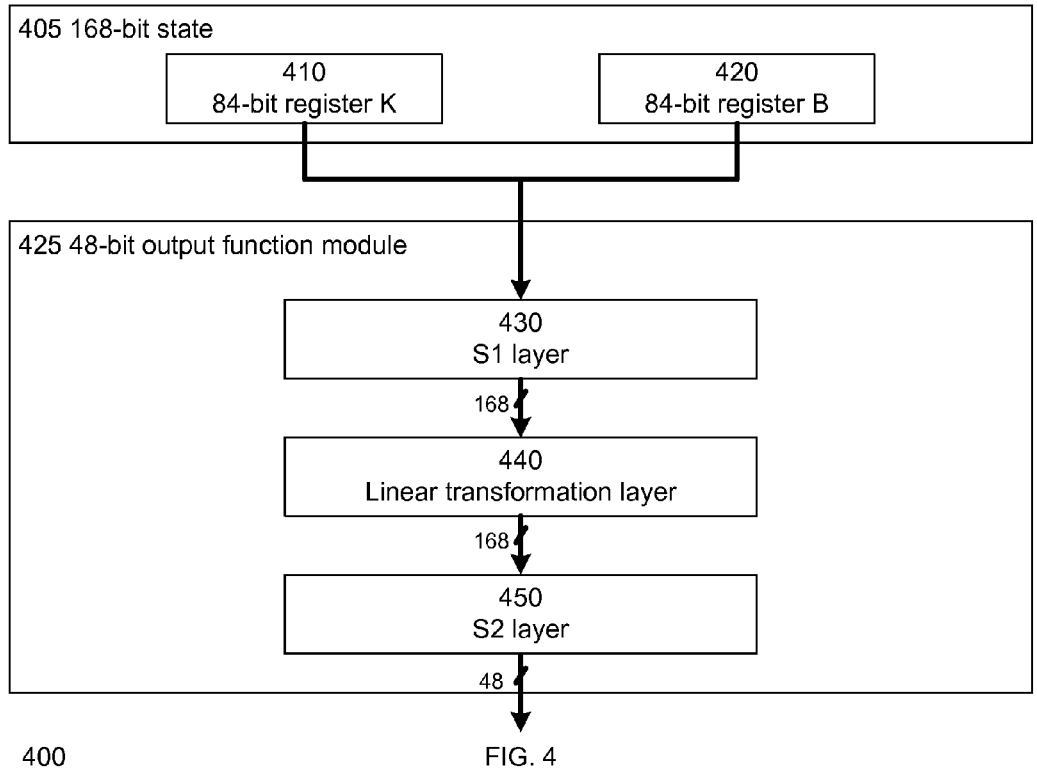
FIG. 4 illustrates a block diagram of a 48-bit output function module in accordance with one embodiment of the invention.

The HDCP encryption module 305 illustrated in FIG. 3 is not meant to be limiting. One of ordinary skill in the relevant will readily appreciate that other variations of the configuration of the HDCP encryption module 305 can be used without affecting the workings of the invention. For example, in one embodiment of the invention, the HDCP encryption module 305 generates more than 48 bits of encryption mask. For example, the HDCP encryption module 305 may generate 64 bits of encryption mask to encrypt 64 bits of video data stream in another embodiment of the invention FIG. 4 illustrates a block diagram 400 of a 48-bit output function module 425 in accordance with one embodiment of the invention. In one embodiment of the invention, the 168-bit state 405 is stored in the 84-bit register K 410 and the 84-bit register B 420. The 48-bit output function module 425 has a substitution layer one (S1 layer) 430, a linear transformation (LT) layer 440 and a S2 layer 450 in one embodiment of the invention.

The S1 layer 430 performs a first substitution box (S-box) mapping of the 168-bit state 405 using a plurality of first S-boxes to generate a plurality of first S-box outputs. The first S-box outputs from the S1 layer 430 has 168 bits and is sent to the LT layer 440. The LT layer 440 performs a linear transformation of the plurality of first S-box outputs using a plurality of LT boxes to generate a plurality of LT outputs.

In one embodiment of the invention, the LT layer 440 generates 168 bits after the linear transformation of the 168 bits from the S1 layer 430. The S2 layer 450 receives 168 bits from the LT layer 440 and performs a second S-box mapping of the plurality of LT outputs using a plurality of second S-boxes to generate a plurality of second S-box outputs. In one embodiment of the invention, one or more outputs from the plurality of second S-box outputs are discarded.

In one embodiment of the invention, 48 output bits are selected from the plurality of second S-box outputs and 128 bits are discarded or ignored. The 48 output bits are selected such that there are no more than two bits selected from each S-box of the S2 layer 450. By doing so, it makes difficult to invert the output bits as there are 2 unknown output bits that are not used in the cipher output.

The 48-bit output function module 425 illustrated in FIG. 4 is not meant to be limiting. One of ordinary skill in the relevant will readily appreciate that other variations of the configuration can be used without affecting the workings of the invention. For example, in one embodiment of the invention, the number of secret state bits can be different from 168 and the encryption mask can have more or less than 168 bits.

Figure 5:
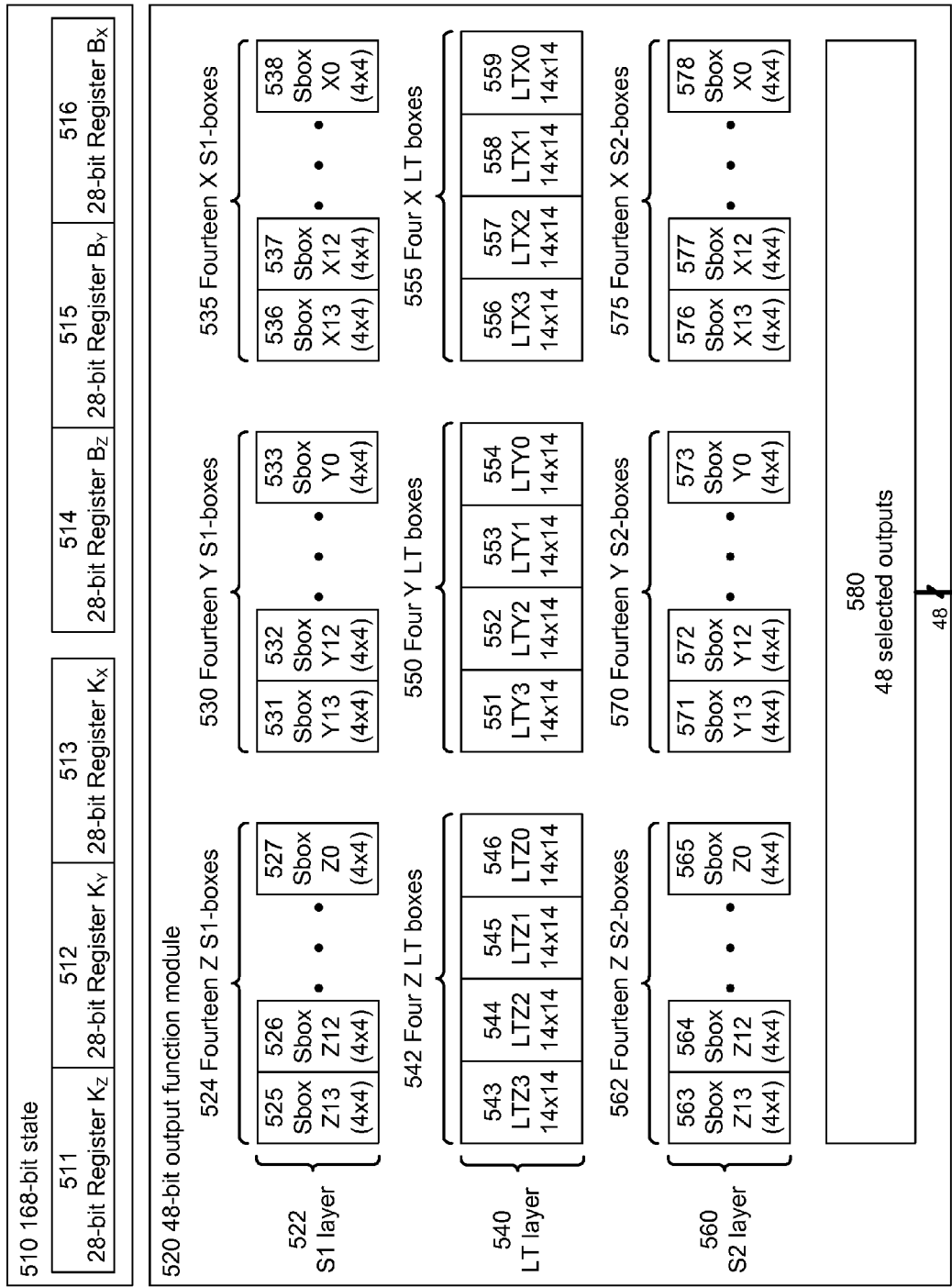
FIG. 5 illustrates a block diagram of a 48-bit output function module in accordance with one embodiment of the invention.

FIG. 5 illustrates a block diagram 500 of a 48-bit output function module 520 in accordance with one embodiment of the invention. In one embodiment of the invention, the 168-bit state 510 has a 84-bit register K that is made up of three sets of registers: Registers $K_X$ 513, $K_Y$ 512, and $K_Z$ 511 that each has 28 bits. The 168-bit state 510 also has another 84-bit register that is made up of three sets of registers: Registers $B_X$ 516, $B_Y$ 515, and $B_Z$ 514 that each has 28 bits in one embodiment of the invention.

The 48-bit output function module 520 uses the 168-bit state 510 to generate a one-way encryption mask. The 48-bit output function module 520 has a S1 layer 522 in one embodiment of the invention. The S1 layer 522 has 42 S1-boxes that divided into three groups: X, Y and Z. The first group of S1-boxes is the fourteen X S1-boxes 535. Each of the S1-boxes in the S1 layer 522 has 4 inputs and produces 4 outputs based on a substitution table or mapping, i.e., 4×4 S-box. For example, in one embodiment of the invention, the S-box X0 538 uses four input bits from the 168-bit state 510 and generates four output bits based on a S1-box X0 mapping table. The S-box X12 537 and the S-box X13 536 illustrates the other S1-boxes in the X S1-boxes 535.

The second and third groups of S1-boxes are made up of the fourteen Y S1-boxes 530 and the fourteen Z S1-boxes 524 respectively. Each of the S1-boxes in the fourteen Y S1-boxes 530 and the fourteen Z S1-boxes 524 has a similar mapping function or operation as the S1-boxes in the X S1-boxes 535. One of ordinary skill in the relevant art will readily appreciate the workings of the S1 boxes in the fourteen Y S1-boxes 530 and the fourteen Z S1-boxes 524 and shall not be described herein.

The S1 layer 522 uses 168 input bits from the 168-bit state 510 and generates or maps 168 output bits for the LT layer 540. In one embodiment of the invention, the LT layer 540 has 12 LT boxes that are grouped into three groups: X, Y and Z. The first group of LT-boxes is the four X LT-boxes 555 that includes LTX0 559, LTX1 558, LTX2 557 and LTX3 556. Each of the LT-boxes in the LT layer 540 has 14 inputs and produces 14 outputs based on a linear transformation function, i.e., 14×14 LT-box. For example, in one embodiment of the invention, the LTX1 558 uses fourteen input bits from the outputs of the S1 layer 522 and generates fourteen output bits based on a LTX1 linear transformation function.

The second and third groups of LT-boxes are made up of the four Y LT-boxes 550 and the four Z S1-boxes 542 respectively. Each of the LT boxes in the four Y LT-boxes 550 and the four Z LT-boxes 542 has a similar mapping function or operation as the LT boxes in the X LT-boxes 555. One of ordinary skill in the relevant art will readily appreciate the workings of the LT boxes in the four Y LT-boxes 550 and the four Z LT-boxes 542 and shall not be described herein.

The LT layer 540 uses 168 input bits from the S1 layer 522 and generates 168 output bits for the S2 layer 560. In one embodiment of the invention, the S2 layer 560 has 42 S2-boxes that divided into three groups: X, Y and Z. The first group of S2-boxes is the fourteen X S2-boxes 575. Each of the S2-boxes in the S2 layer 560 has 4 inputs and produces 4 outputs based on a substitution table or mapping, i.e., 4×4 S-box. For example, in one embodiment of the invention, the S-box X0 578 uses four input bits from the output bits of the LT layer 540 and generates four output bits based on a S2-box X0 mapping table. The S-box X12 577 and the S-box X13 576 illustrates the other S2-boxes in the X S2-boxes 575.

The second and third groups of S2-boxes are made up of the fourteen Y S2-boxes 570 and the fourteen Z S2-boxes 562 respectively. Each of the S2 boxes in the fourteen Y S2-boxes 570 and the fourteen Z S2-boxes 562 has a similar mapping function or operation as the S2 boxes in the X S2-boxes 575. One of ordinary skill in the relevant art will readily appreciate the workings of the S2 boxes in the fourteen Y S2-boxes 570 and the fourteen Z S2-boxes 562 and shall not be described herein.

The S2 layer 560 uses 168 input bits from the LT layer 540 and generates 168 output bits. In one embodiment of the invention, 120 bits from the 168 output bits of the S2 layer 560 are not selected as the 48 selected outputs 580. The 48 selected outputs 580 provide an encryption mask that is used to produce an encryption data stream. The 120 discarded bits make it very difficult to guess or determine the original 168-bit state 510 and increases the security of the encryption module.

The illustration of the 48-bit output function module 520 is not meant to be limiting and one of ordinary skill in the relevant art will readily appreciate how to modify the 48-bit output function module 520 for another configuration and these modifications shall not be described herein. For example, in one embodiment of the invention, the size of the S-boxes can be increased or decreased. Similarly, the size of the LT-boxes can be increased or decreased in one embodiment of the invention. The number of output bits of the 48-bit output function module 520 can be more or less than 48 bits in another embodiment of the invention.

FIG. 6A illustrates a mapping table 600 of a 168-bit state to a S1 layer in accordance with one embodiment of the invention. For clarity of illustration, FIG. 6A is discussed with reference to FIG. 5. The mapping table 600 illustrates the mapping of each input bit of each S-box in the 51 layer 522 to the bits of the registers B and K in the 168-bit state 510 in one embodiment of the invention.

Each of the S-boxes in the fourteen X S1-boxes 535 uses inputs from the register $B_X$ 516 and $K_X$ 513, each of the S-boxes in the fourteen Y S1-boxes 530 uses inputs from the register $B_Y$ 515 and $K_Y$ 512 and each of the S-boxes in the fourteen Z S1-boxes 524 uses inputs from the register $B_Z$ 514 and $K_Z$ 511 in one embodiment of the invention. For example, in one embodiment of the invention, when i is equal to 3 in the mapping table 600, the input bit 0 of the S1-box Y3 uses output bit 6 [2*3=6] from the register $K_Y$ 512, the input bit 1 of the S1-box Y3 uses output bit 7 [2*3+1=7] from the register $K_Y$ 512, the input bit 2 of the S1-box Y3 uses output bit 6 [2*3=6] from the register $B_Y$ 515, and the input bit 3 of the S1-box Y3 uses output bit 7 [2*3+1=7] from the register $B_Y$ 515.

In another example, in one embodiment of the invention, when i is equal to 13 in the mapping table 600, the input bit 0 of the S1-box Z13 uses output bit 26 [2*13=26] from the register $K_Z$ 511, the input bit 1 of the S1-box Z13 uses output bit 27 [2*13+1=27] from the register $K_Z$ 511, the input bit 2 of the S1-box Z13 uses output bit 26 [2*13=26] from the register $B_Z$ 514, and the input bit 3 of the S1-box Z13 uses output bit 27 [2*13+1=27] from the register $B_Z$ 514.

One of ordinary skill in the relevant art will readily appreciate the workings of the mapping table 600 and the other combinations in the mapping table 600 shall not be described herein. The mapping table 600 of the 168-bit state to the S1 layer is not meant to be limiting and other mapping tables can be used without affecting the workings of the invention. For example, in one embodiment of the invention, the design criteria of the S-boxes in the S1 layer 522 is based at least in part on the article by Anderson et al., "Serpent: A Flexible Block Cipher With Maximum Assurance", In The First Advanced Encryption Standard Candidate Conference, 1998.

FIG. 6B illustrates a S-box table 650 in accordance with one embodiment of the invention. For clarity of illustration, FIG. 6B is discussed with reference to FIG. 5. In one embodiment of the invention, the S-box table 650 illustrates the substitution values for the S-boxes in the S1 layer 522.

The S-box table 650 illustrates decimal values for each input and output of each S-box. For example, in one embodiment of the invention, the S1-box Z0 has a four input bits of 0010b, i.e., a decimal value of 2. The S-box table 650 substitutes the input value of 2 for the S1-box Z0 with an output value of 7, i.e., 0111b. The S1-box Z0 generates an output of 0111b after the S-box substitution or transformation in S1 layer 522.

In another example, in one embodiment of the invention, the S1-box Y8 has a four input bits of 1100b i.e., a decimal value of 12. The S-box table 650 substitutes the input value of 12 for the S1-box Y8 with an output value of 12, i.e., 1100b. In one embodiment of the invention, the S-box table 650 substitutes the input value with the same output value. The S1-box Y8 generates an output of 1100b after the S-box substitution or transformation in S1 layer 522.

One of ordinary skill in the relevant art will readily appreciate the workings of the S-box table 650 and the other combinations in the S-box table 650 shall not be described herein. The S-box table 650 is not meant to be limiting and other mapping tables can be used without affecting the workings of the invention.

FIG. 7A illustrates a mapping table 700 of a S1 layer to a linear transformation layer in accordance with one embodiment of the invention. For clarity of illustration, FIG. 7A is discussed with reference to FIG. 5. The mapping table 700 illustrates the mapping of each input bit of each LT box in the LT layer 710 to the output bits of the S1 layer 522.

For example, in one embodiment of the invention, when j is equal to 0 in the mapping table 700, the input bit 0 of LTX0 559 uses the output bit 0 from the S1-box X0 538. When j is equal to 1 in the mapping table 700, the input bit 1 of LTX0 559 uses the output bit 1 from the S1-box X0 538.

In another example, in one embodiment of the invention, when j is equal to 7 in the mapping table 700, the input bit 7 of LTX3 556 uses the output bit 3 from the S1-box X0 538 $[X_{7-7}=X_0]$. When j is equal to 13 in the mapping table 700, the input bit 13 of LTZ0 546 uses the output bit 2 from the S1-box X13 536.

One of ordinary skill in the relevant art will readily appreciate the workings of the mapping table 700 and the other combinations in the mapping table 700 shall not be described herein. The mapping table 700 is not meant to be limiting and other mapping tables can be used without affecting the workings of the invention.

FIG. 7B illustrates a LT table 750 in accordance with one embodiment of the invention. For clarity of illustration, FIG. 7B is discussed with reference to FIG. 5. In one embodiment of the invention, the LT table 750 illustrates the LT function of each output bit of each LT-box in the LT layer 540.

In one embodiment of the invention, each LT output 760 is an XOR function of seven or eight inputs as illustrated in the LT table 750. For example, in one embodiment of the invention, the output bit 3 of the LTY2 552 is an XOR function of the input bits 0, 2, 4, 7, 8, 9, 11, and 12 of the LTY2 552. In another example, in one embodiment of the invention, the output bit 7 of the LTYZ3 543 is an XOR function of the input bits 2, 4, 6, 8, 11, 12 and 13 of the LTZ3 543.

One of ordinary skill in the relevant art will readily appreciate the workings of the LT table 750 and the other combinations in the LT table 750 shall not be described herein. The LT table 750 is not meant to be limiting and other mapping tables can be used without affecting the workings of the invention. For example, in one embodiment of the invention, the design criteria of the LT table 750 in the LT layer 540 is described at least in part in Joan Daemen and Vincent Rijmen, "The Design of Rijndael: AES—The Advanced Encryption Standard", Springer-Verlag, 2002. In one embodiment of the invention, the linear transformation in the LT table 750 is selected to have optimal and equal linear and differential branch numbers while not using too many inputs for each output to keep the gate count and latency reasonable.

FIG. 8A illustrates a mapping table 800 of a LT layer to a S2 layer in accordance with one embodiment of the invention. For clarity of illustration, FIG. 8A is discussed with reference to FIG. 5. The mapping table 800 illustrates the mapping of each input bit of each S-box in the S2 layer 560 to the output bits of the LT layer 540.

Each of the S-boxes in the fourteen X S2-boxes 575 uses inputs from the four X LT boxes 555, each of the S-boxes in the fourteen Y S2-boxes 570 uses inputs from the four Y LT boxes 550 and each of the S-boxes in the fourteen Z S2-boxes 562 uses inputs from the four Z LT boxes 542 in one embodiment of the invention. For example, in one embodiment of the invention, when i is equal to 6 in the mapping table 800, the input bit 0 of the S2-box X6 uses output bit 6 [i=6] from the LTX0 559, the input bit 1 of the S2-box X6 uses output bit 6 from the LTX1 558, the input bit 2 of the S2-box X6 uses output bit 6 from the LTX2 557, and the input bit 3 of the S2-box X6 uses output bit 6 from the LTX3 556.

In another example, in one embodiment of the invention, when i is equal to 11 in the mapping table 800, the input bit 0 of the S2-box Z11 uses output bit 11 [i=11] from the LTZ0 546, the input bit 1 of the S2-box Z11 uses output bit 11 from the LTZ1 545, the input bit 2 of the S2-box Z11 uses output bit 11 from the LTZ2 544, and the input bit 3 of the S2-box Z11 uses output bit 11 from the LTZ3 543.

One of ordinary skill in the relevant art will readily appreciate the workings of the mapping table 800 and the other combinations in the mapping table 800 shall not be described herein. The mapping table 800 of the LT layer 540 to the S2 layer 560 is not meant to be limiting and other mapping tables can be used without affecting the workings of the invention. For example, in one embodiment of the invention, the design criteria of the S-boxes in the S2 layer 560 is based at least in part on the article by Anderson et al., "Serpent: A Flexible Block Cipher With Maximum Assurance", In The First Advanced Encryption Standard Candidate Conference, 1998.

FIG. 8B illustrates a S-box table 850 in accordance with one embodiment of the invention. For clarity of illustration, FIG. 8B is discussed with reference to FIG. 5. In one embodiment of the invention, the S-box table 850 illustrates the substitution values for the S-boxes in the S2 layer 560.

The S-box table 850 illustrates decimal values for each input and output of each S-box. For example, in one embodiment of the invention, the S2-box Y3 has a four input bits of 1111b, i.e., a decimal value of 15. The S-box table 850 substitutes the input value of 15 for the S2-box Y3 by an output value of 7, i.e., 0111b. The S2-box Y3 generates an output of 0111b after the S-box substitution or transformation in S2 layer 560.

In another example, in one embodiment of the invention, the S2-box Z2 has a four input bits of 1001b, i.e., a decimal value of 9. The S-box table 850 substitutes the input value of 9 for the S2-box Z2 by an output value of 11, i.e., 1011b. The S2-box Z2 generates an output of 1011b after the S-box substitution or transformation in S2 layer 560.

One of ordinary skill in the relevant art will readily appreciate the workings of the S-box table 850 and the other combinations in the S-box table 850 shall not be described herein. The S-box table 850 is not meant to be limiting and other mapping tables can be used without affecting the workings of the invention.

FIG. 9 illustrates a selection table 900 for an encryption mask 910 in accordance with one embodiment of the invention. The encryption mask 910 has 48 bits in one embodiment of the invention. The selection table 900 illustrates how each of the 48 bits of the encryption mask 910 is selected from the outputs of the S2 layer 560.

For example, in one embodiment of the invention, the bit 20 of the encryption mask 910 is selected as the output bit 0 of the S2-box Y3. In another example, in one embodiment of the invention, the bit 47 of the encryption mask 910 is selected as the output bit 2 of the S2-box Z12. One of ordinary skill in the relevant art will readily appreciate the workings of the selection table 900 and the other combinations in the selection table 900 shall not be described herein. The selection table 900 is not meant to be limiting and other mapping tables can be used without affecting the workings of the invention.

In one embodiment of the invention, the selection table 900 for an encryption mask 910 is created such that there are no more than two output bits that can be selected for any S-box in the S2 layer 560. The selection of the output bits of the encryption mask 910 is based on the number of input bits that affect the output bits across degrees 1 to 9. Each selected bit of the encryption mask 910 should have as many inputs that affect each selected bit in one embodiment of the invention.

Figure 10:
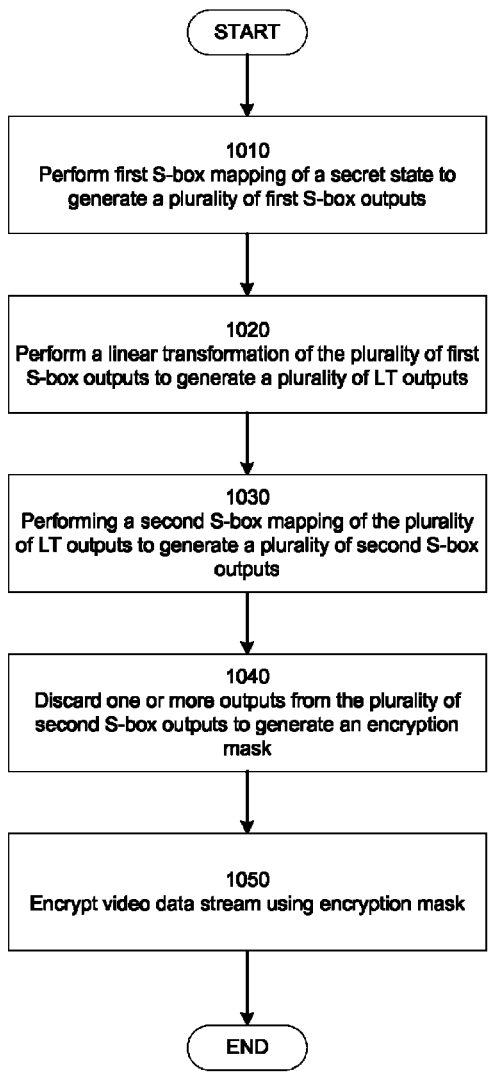
FIG. 10 illustrates a flowchart of an encryption process in accordance with one embodiment of the invention.

FIG. 10 illustrates a flowchart 1000 of an encryption process in accordance with one embodiment of the invention. In step 1010, the flow 1000 performs a first S-box mapping of a secret state using a plurality of first S-boxes to generate a plurality of first S-box outputs. In one embodiment of the invention, the secret state is stored the in the register K 410 and register B 420. In step 1020, the flow 1000 performs a linear transformation of the plurality of first S-box outputs using a plurality of LT boxes to generate a plurality of LT outputs.

In step 1030, the flow 1000 performing a second S-box mapping of the plurality of LT outputs using a plurality of second S-boxes to generate a plurality of second S-box outputs. In step 1040, the flow 1000 discards one or more outputs from the plurality of second S-box outputs to generate an encryption mask. In step 1040, the flow 1000 encrypts a video data stream using the generated encryption mask to generate an encrypted video data stream and the flow 1000 ends.

Figure 11:
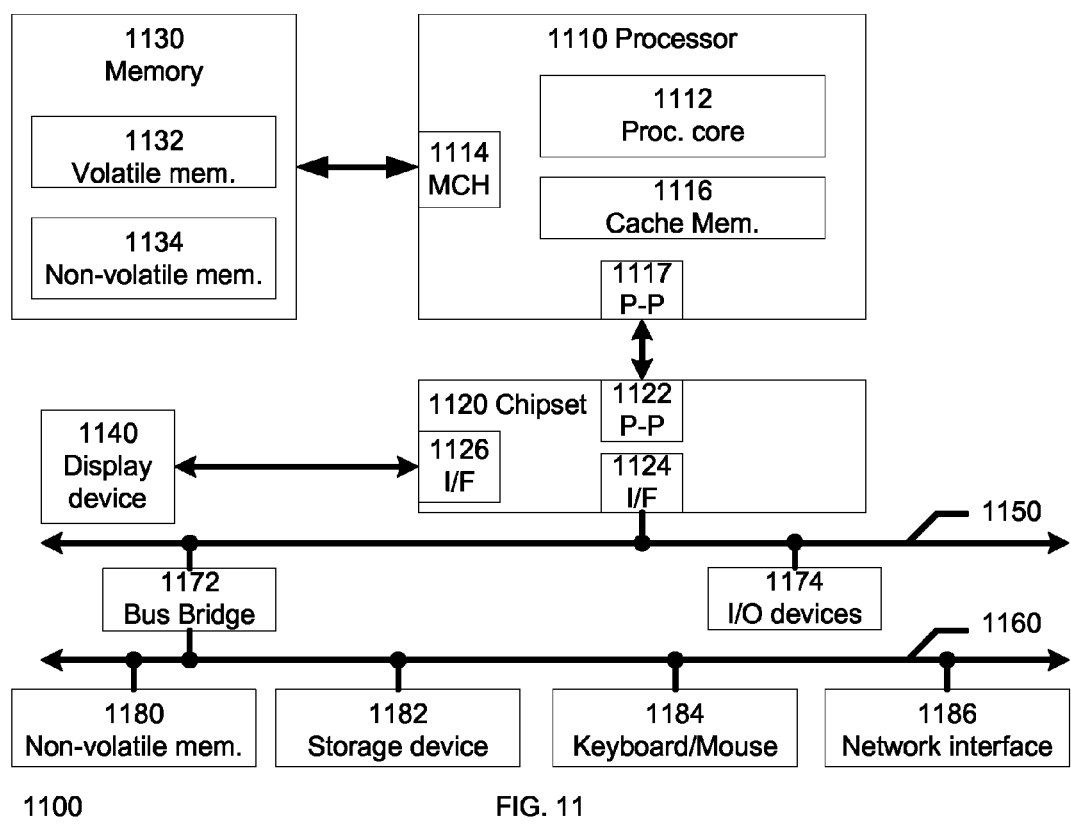
FIG. 11 illustrates a system to implement the methods disclosed herein in accordance with one embodiment of the invention.

FIG. 11 illustrates a system 1100 to implement the methods disclosed herein in accordance with one embodiment of the invention. The system 1100 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 1100 used to implement the methods disclosed herein may be a system on a chip (SOC) system.

The processor 1110 has a processing core 1112 to execute instructions of the system 1100. The processing core 1112 includes, but is not limited to, pre-fetch logic to fetch instructions, decode logic to decode the instructions, execution logic to execute instructions and the like. The processor 1110 has a cache memory 1116 to cache instructions and/or data of the system 1100. In another embodiment of the invention, the cache memory 1116 includes, but is not limited to, level one, level two and level three, cache memory or any other configuration of the cache memory within the processor 1110.

The memory control hub (MCH) 1114 performs functions that enable the processor 1110 to access and communicate with a memory 1130 that includes a volatile memory 1132 and/or a non-volatile memory 1134. The volatile memory 1132 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1134 includes, but is not limited to, NAND flash memory, phase change memory (PCM), read only memory (ROM), electrically erasable programmable read only memory (EEPROM), or any other type of non-volatile memory device.

The memory 1130 stores information and instructions to be executed by the processor 1110. The memory 1130 may also stores temporary variables or other intermediate information while the processor 1110 is executing instructions. The chipset 1120 connects with the processor 1110 via Point-to-Point (PtP) interfaces 1117 and 1122. The chipset 1120 enables the processor 1110 to connect to other modules in the system 1100. In one embodiment of the invention, the interfaces 1117 and 1122 operate in accordance with a PtP communication protocol such as the Intel® QuickPath Interconnect (QPI) or the like. The chipset 1120 connects to a display device 1140 that includes, but is not limited to, liquid crystal display (LCD), cathode ray tube (CRT) display, or any other form of visual display device.

In addition, the chipset 1120 connects to one or more buses 1150 and 1155 that interconnect the various modules 1174, 1160, 1162, 1164, and 1166. Buses 1150 and 1155 may be interconnected together via a bus bridge 1172 if there is a mismatch in bus speed or communication protocol. The chipset 1120 couples with, but is not limited to, a non-volatile memory 1160, a mass storage device(s) 1162, a keyboard/mouse 1164 and a network interface 1166. The mass storage device 1162 includes, but is not limited to, a solid state drive, a hard disk drive, an universal serial bus flash memory drive, or any other form of computer data storage medium. The network interface 1166 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 11 are depicted as separate blocks within the system 1100, the functions performed by some of these blocks may be integrated within a single semiconductor circuit or may be implemented using two or more separate integrated circuits. For example, although the cache memory 1116 is depicted as a separate block within the processor 1110, the cache memory 1116 can be incorporated into the processor core 1112 respectively. The system 1100 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
storing a secret state in at least two registers;
performing a first substitution box (S-box) mapping of the secret state using first S-boxes to generate first S-box outputs;
performing a linear transformation (LT) of the first S-box outputs using LT boxes to generate LT outputs;
performing a second S-box mapping of the LT outputs using second S-boxes to generate second S-box outputs; and
selecting no more than two outputs from each second S-box as an encryption mask and not selecting at least one output from each second S-box.

2. The method of claim 1, further comprising:
performing an exclusive OR (XOR) function of the encryption mask with a video data stream to generate an encrypted video data stream.

3. The method of claim 1, wherein the secret state is generated based at least in part from an Advanced Encryption Standard (AES) algorithm.

4. The method of claim 1, wherein the secret state comprises one hundred and sixty-eight bits.

5. The method of claim 4, wherein the first S-boxes comprise three groups of layer one S-boxes, each group having fourteen layer one S-boxes, and wherein each layer one S-box has a layer one mapping table, and wherein performing the first S-box mapping of the secret state using the first S-boxes to generate the first S-box outputs comprises:
for each layer one S-box, mapping four bits of the secret state using the layer one mapping table to obtain four outputs, wherein the four outputs are part of the first S-box outputs.

6. The method of claim 5, wherein the LT boxes comprise three groups of LT boxes, each group having four LT boxes, and wherein each output bit of each LT box is a function of one or more bits of the first S-box outputs, and wherein performing the LT of the first S-box outputs using the LT boxes to generate the LT outputs comprises:
for each LT box, generate fourteen outputs based on the function of the one or more bits of the first S-box outputs, wherein the generated fourteen outputs are part of the LT outputs.

7. The method of claim 6, wherein the plurality of second S-boxes comprise three groups of layer two S-boxes, each group having fourteen layer two S-boxes, and wherein each layer two S-box has a layer two mapping table, and wherein performing the second S-box mapping of the LT outputs using the second S-boxes to generate the second S-box outputs comprises:
for each layer two S-box, mapping four bits of the LT outputs using the layer two mapping table to obtain four outputs, wherein the four outputs are part of the second S-box outputs.

8. The method of claim 1, wherein the method is compliant at least in part with a High-bandwidth Digital Content Protection (HDCP) specification.

9. An apparatus comprising:
at least one memory including at least two registers to store a secret state; and
a High-bandwidth Digital Content Protection (HDCP) encryption logic module, coupled to the at least one memory, comprising:
a block cipher; and
a one way output function to:
receive state bits of the secret state from the block cipher;
perform a first substitution box (S-box) mapping of the state bits using first S-boxes to generate first S-box outputs;
perform a linear transformation (LT) of the first S-box outputs using LT boxes to generate LT outputs;
perform a second S-box mapping of the LT outputs using second S-boxes to generate second S-box outputs; and
discard one or more of the second S-box outputs to generate an encryption mask that has a lesser number of bits than the state bits based on discarding the one or more of the second S-box outputs.

10. The apparatus of claim 9, wherein the HDCP encryption module is to: encrypt a received video data stream using the generated mask.

11. The apparatus of claim 10, wherein the received video data stream is compliant at least in part with a Digital Interactive Interface for Video and Audio (DiiVA) specification.

12. The apparatus of claim 9, wherein the block cipher is to perform at least one round function to update the state bits.

13. A non-transitory machine readable storage medium having instructions stored thereon which, when executed, cause a processor to perform the following method:
performing a first substitution box (S-box) mapping of a secret state, included in at least two registers, using a plurality of first S-boxes to generate a plurality of first S-box outputs;
performing a linear transformation (LT) of the plurality of first S-box outputs using a plurality of LT boxes to generate a plurality of LT outputs;
performing a second S-box mapping of the plurality of LT outputs using a plurality of second S-boxes to generate a plurality of second S-box outputs; and
selecting no more than two outputs from each second S-box and ignoring at least one output from the plurality of second S-box outputs.

14. The medium of claim 13, the method further comprising:
performing an exclusive OR (XOR) function of the plurality of outputs with a video data stream to generate an encrypted video data stream.

15. The medium of claim 13, wherein the secret state is generated based at least in part from an Advanced Encryption Standard (AES) algorithm.

16. The medium of claim 13, wherein the secret state comprises one hundred and sixty-eight bits.

17. The medium of claim 16, wherein the plurality of first S-boxes comprises three groups of layer one S-boxes, each group having fourteen layer one S-boxes, and wherein each layer one S-box has a layer one mapping table, and wherein performing the first S-box mapping of the secret state using the plurality of first S-boxes to generate the plurality of first S-box outputs comprises:
for each layer one S-box, mapping four bits of the secret state using the layer one mapping table to obtain four outputs, wherein the four outputs are part of the plurality of first S-box outputs.

18. The medium of claim 17, wherein the plurality of LT boxes comprises three groups of LT boxes, each group having four LT boxes, and wherein each output bit of each LT box is a function of one or more bits of the plurality of first S-box outputs, and wherein performing the LT of the plurality of first S-box outputs using the plurality of LT boxes to generate the plurality of LT outputs comprises:
for each LT box, generate fourteen outputs based on the function of the one or more bits of the plurality of first S-box outputs, wherein the generated fourteen outputs are part of the plurality of LT outputs.

19. The medium of claim 18, wherein the plurality of second S-boxes comprises three groups of layer two S-boxes, each group having fourteen layer two S-boxes, and wherein each layer two S-box has a layer two mapping table, and wherein performing the second S-box mapping of the plurality of LT outputs using the plurality of second S-boxes to generate the plurality of second S-box outputs comprises:
for each layer two S-box, mapping four bits of the plurality of LT outputs using the layer two mapping table to obtain four outputs, wherein the four outputs are part of the plurality of second S-box outputs.

20. The medium of claim 13, wherein the method is compliant at least in part with a High-bandwidth Digital Content Protection (HDCP) specification.

* * * * *

UNITED STATES PATENT AND TRADEMARK OFFICE
CERTIFICATE OF CORRECTION

PATENT NO.        : 8,675,865 B2                                   Page 1 of 1
APPLICATION NO.   : 12/889901
DATED             : March 18, 2014
INVENTOR(S)       : Graunke It is certified that error appears in the above-identified patent and that said Letters Patent is hereby corrected as shown below:

In the Claims

Col. 13:
Line 7, Claim 7, delete "plurality of".

Signed and Sealed this
Twentieth Day of May, 2014

Michelle K. Lee
*Deputy Director of the United States Patent and Trademark Office*